J. E. GRAMLICH.
LEAF SPRING CONSTRUCTION.
APPLICATION FILED DEC. 5, 1914.

1,195,460.

Patented Aug. 22, 1916.

Witnesses:
Chas. H. Young.
F. B. Pickard.

Jacob E. Gramlich,
Inventor

By Parsons & Boxell
Attorneys

UNITED STATES PATENT OFFICE.

JACOB E. GRAMLICH, OF SYRACUSE, NEW YORK, ASSIGNOR TO CHASE MOTOR TRUCK CO., OF SYRACUSE, NEW YORK, A CORPORATION OF NEW YORK.

LEAF-SPRING CONSTRUCTION.

1,195,460.  Specification of Letters Patent.  Patented Aug. 22, 1916.

Application filed December 5, 1914. Serial No. 875,637.

*To all whom it may concern:*

Be it known that I, JACOB E. GRAMLICH, a citizen of the United States, residing at Syracuse, in the county of Onondaga and State of New York, have invented a certain new and useful Leaf-Spring Construction, of which the following is a specification.

This invention has for its object a particularly simple and efficient vehicle spring construction by which the usual strut rods are eliminated; and the invention consists in the novel features of construction hereinafter set forth and claimed.

In describing this invention, reference is had to the accompanying drawings, in which like characters designate corresponding parts in all the views.

Figure 1:
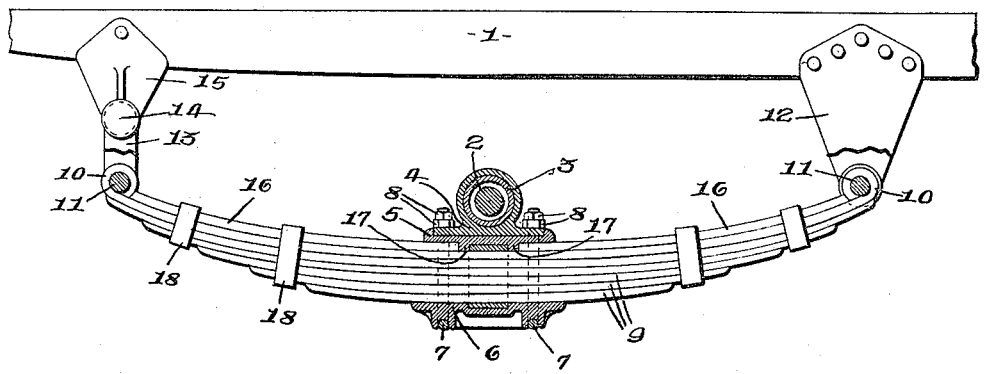
Figure 2:
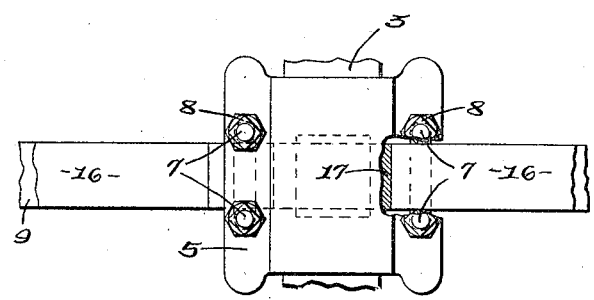

Figure 1 is an elevation, partly in section, of a spring construction embodying my invention, the contiguous portion of the vehicle being also shown. Fig. 2 is a fragmentary view showing in plan parts seen in Fig. 1.

This spring construction comprises, generally, a leaf having a shoulder at its end, a supporting bracket located at a point remote from said shoulder, and a strut member interposed between said shoulder and the bracket and abutting at its ends against the same, this strut member being usually in the form of a leaf built into the spring.

I have here shown my invention as embodied in a semi-elliptical spring connected at its ends to the body of a vehicle and supported intermediate of its ends by a bracket on the axle of the vehicle.

1 designates the sill of the body of the vehicle.

2 is the axle.

3 is the tubular casing which usually surrounds the axle in motor vehicle construction.

4 is the supporting bracket having a bearing on the axle casing 3 and including a base plate integral with the bearing, upper and lower clamping plates 5, 6 between which the spring leaves are clamped, and clamping members as U-shape clips 7, the branches of which extend on opposite sides of the leaves and through the upper plate 5 and the base plate adjoining the bearing 4, and the intermediate parts of which extend under the lower plate 6. Nuts 8 screw on the ends of the U-shape clips.

9 designates the leaves of the spring which are supported by the bracket 4 and which are clamped intermediate of their ends between the plates 5, 6. One of the leaves of the spring, as the main leaf, is formed with shoulders at its opposite ends. Said shoulders are in this form of my invention the eyes 10 usually provided on the main leaf for receiving pins or bolts 11 which connect the ends of the spring to the body of the vehicle. As here shown, one end of the spring is connected by a bolt 11 to a bracket 12 fixed to the sill 1 of the vehicle, and the other end of the spring is connected by a similar pin or bolt 11 to a shackle 13 which is pivoted at 14 to a bracket 15 fixed to the sill 1 of the vehicle.

16 are strut members which are in the form of leaves built into the leaf spring, these strut members being interposed between the shoulders or eyes 10 and the bracket 4, and being here shown as abutting at their outer ends against said eyes and at their inner ends against shoulders 17 provided on the plate 5. The shoulders 17 are inset from the front and rear edges of the plate 5 so that marginal portions of the plate 5 overlie the upper faces of the inner end portions of the strut members. The strut members are built into the leaf spring construction so as to be contained therein and are held in assembled relation with the spring leaves by the bands 18.

The spring leaves are continuous from end to end and are not weakened by bolt holes, etc. Hence the leaves cannot transmit motion in an endwise direction, as they are liable to slip in supporting bracket. Therefore strut rods have heretofore been employed. By my invention, the strut members 16 built into the spring, take any thrust on the spring and hold the axle from moving forwardly or rearwardly relatively to the body of the vehicle. In other words, the strut members perform the function of strut rods.

What I claim is:—

1. The combination of a spring leaf having a bearing at one end a supporting bracket located at a point remote from the bearing, a strut member interposed between the bearing and the bracket and shouldering at its opposite ends against said bearing and the bracket, substantially as and for the purpose set forth.

2. The combination of a spring leaf, a supporting bracket, and a strut member interposed between the end of the main leaf and the bracket, the strut member being in the form of a leaf lying contiguous to the spring leaf, substantially as and for the purpose specified.

3. The combination of a spring leaf having a shoulder near one end, a supporting bracket for the spring located at a point remote from the shoulder, and a strut member in the form of a leaf lying contiguous to the spring leaf and interposed between said shoulder and the bracket, and abutting at its ends against the shoulder and the bracket, substantially as and for the purpose set forth.

4. The combination of a spring leaf having an eye near one end, a supporting bracket located at a point remote from the eye, and a strut member interposed between the eye and the bracket and abutting at its ends against said eye and the bracket, substantially as and for the purpose described.

5. The combination of a leaf spring, one of the leaves thereof having shoulders near its opposite ends, a supporting bracket for the spring located intermediate of the ends thereof, and strut members interposed between the shoulders and the bracket and abutting at their ends against the shoulders and the bracket, substantially as and for the purpose specified.

6. The combination of a leaf spring, one of the leaves thereof having shoulders near its opposite ends, a supporting bracket for the spring located intermediate of the ends thereof, and strut members interposed between the shoulders and the bracket and abutting at their ends against the shoulders and the bracket, said members being in the form of leaves built into the spring, substantially as and for the purpose set forth.

7. The combination of a leaf spring having eyes at its opposite ends, a supporting bracket engaging the spring between the ends thereof, and strut members interposed between the eyes and the bracket, the strut members being in the form of leaves lying on the main leaf and abutting at their ends against said eyes and against the bracket, substantially as and for the purpose described.

8. The combination of a vehicle frame, an axle, a bracket mounted on the axle, a leaf spring carried between its ends by the bracket, the leaf spring having eyes at its opposite ends, one eye being pivoted to the frame and a link pivoted in the other eye and to the frame, and strut members interposed between said eyes and the bracket and abutting at their ends against the same, substantially as and for the purpose described.

In testimony whereof, I have hereunto signed my name in the presence of two attesting witnesses, at Syracuse, in the county of Onondaga, and State of New York, this 23rd day of November, 1914.

JACOB E. GRAMLICH.

Witnesses:
LESTER M. LLEWELLYN,
WM. F. HUNNELSBACH.

Copies of this patent may be obtained for five cents each, by addressing the "Commissioner of Patents, Washington, D. C."